UNITED STATES PATENT OFFICE.

URIAH CUMMINGS AND LEWIS J. BENNETT, OF BUFFALO, NEW YORK.

IMPROVEMENT IN THE MANUFACTURE OF HYDRAULIC CEMENT.

Specification forming part of Letters Patent No. 205,616, dated July 2, 1878; application filed June 5, 1878.

*To all whom it may concern:*

Be it known that we, URIAH CUMMINGS and LEWIS J. BENNETT, both of Buffalo, in the county of Erie and State of New York, have jointly invented certain new and useful Improvements in the Manufacture of Hydraulic Cement; and we do hereby declare that the following description of our said invention forms a full, clear, and exact specification, which will enable others skilled in the art to which it appertains to make and use the same.

Our present invention relates to improvements in the manufacture of hydraulic cement, which said improvements are hereinafter first fully set forth and described, and then pointed out in the claims; the object of our said invention being the utilization of a waste product in the manufacture of hydraulic cement from the natural cement-stone—viz., the scoria or vitrified portion of the cement-stone, which has heretofore not been attempted.

It is a fact well known to those familiar with the manufacture of hydraulic cement from the natural cement-stone that in the course of calcination quite a percentage thereof becomes vitrified or clinkered, owing to the impossibility of equally distributing the fuel in the kiln, and consequent variation in the intensity and temperature of the fire, said unequal distribution being frequently caused by so-called "slides," or a settling of the material in the kiln, and the accumulation of the combustible matter at certain places in undue proportion.

These vitrified portions of the cement-stone have heretofore been selected from the mass and thrown away as entirely useless and waste, resulting in a loss of from five to fifteen per cent. of the stone, and causing also a considerable outlay for hauling the material away; but, notwithstanding the fact that the larger portion of this vitrified stone is removed, a smaller part thereof finds its way into the crushers, breakers, and disintegrating-mills, and is reduced to a coarse, gritty substance. This vitrified portion of the cement-stone is so extremely hard that the ordinary facilities for pulverizing the same are unable to properly reduce it to the necessary degree of fineness, and the gritty mass is thus incorporated in the cement, and thereby considerably reducing the quality of the latter.

By passing domestic hydraulic cement through a No. 50 screen or bolt, the clinkered or vitrified portion is separated and thus detected, and while the properly calcined and ground portion may and will do good service, this vitrified portion is a detriment, since it will serve only the purpose of an equal amount of sharp sand; and it is a matter of fact that by screening the scoria out of a barrel of commercial cement, and substituting an equal portion of sand in place thereof, the new product and its market value would actually be the same as before the screening had taken place. It will therefore be seen that by screening the cement, as heretofore described, or, rather, by removing the scoria, the quality of the remaining product is improved in proportion to the percentage of scoria removed from the bulk.

We have inaugurated a series of experiments with a view of utilizing this scoria, and in the course of our experiments we have discovered that the scoria, if reduced to an impalpable or nearly impalpable powder, will produce a cement fully equal, if not superior, in strength and sand-carrying capacity, to the best brands of English Portland cement.

We therefore propose to separate the scoria or vitrified portion of the cement-stone from the properly-calcined portion by separately reducing it to powder in properly-constructed mills, feeding slow enough to obtain the desired fineness of the ground product. This separation may take place either directly after the material leaves the kiln, or by screening the scoria out of the cement, and then separately proceeding with the latter, as hereinbefore stated.

The product derived from the scoria after proper treatment is, as heretofore stated, far superior to either commercial cement, or to commercial cement having the scoria removed by screening or otherwise. Therefore, by mixing the cement produced from the scoria either of the above cements is improved and increased in value in exact proportion to the amount of our scoria cement incorporated with said domestic cements.

Imported Portland cement, owing to its high price, is greatly imitated in the United States; but it costs a manufacturer not less than three dollars per barrel to produce a cement equal in quality to said English cement. Our cement, being equal in quality to the best brands of that cement, costs us but a trifle more to manufacture than the domestic commercial cement, it being made from an entirely waste product. We can therefore afford to sell our cement at a price far below the English or domestic Portland, and at but a trifle above that of domestic commercial cement, thus stimulating home production and resulting in a great saving to the purchaser.

We claim—

1. The method of producing hydraulic cement, consisting, essentially, in first crushing and disintegrating the calcined and the vitrified portions of the natural cement-stone, then separating the vitrified portion by screening or bolting, and, lastly, reducing the vitrified portion separately to powder, substantially as specified.

2. As an improved article of manufacture, hydraulic cement having the vitrified portion of the cement-stone removed by screening, as and for the object stated.

3. As an improved article of manufacture, hydraulic cement produced from the vitrified portion of the cement-stone, substantially in the manner as and for the purpose specified.

4. The method of producing hydraulic cement, consisting in disintegrating the properly-calcined and the vitrified stone, then separating the vitrified portion from the former and separately reducing the same to powder, and, lastly, reincorporating the same with the former, as and for the object specified.

5. The compound cement hereinbefore described, consisting of the properly-calcined and disintegrated portion and the vitrified and powdered parts of cement-stone, the latter being separately reduced to such powder and then mixed with the former, as and for the object specified.

6. The method of utilizing the waste product of a kiln—viz., the scoria or vitrified portion of cement-stone—consisting in crushing and grinding the same to a fine powder, substantially as hereinbefore stated.

In testimony that we claim the foregoing as our invention we have hereto set our hands and affixed our seals in the presence of two subscribing witnesses.

URIAH CUMMINGS. [L. S.]
LEWIS J. BENNETT. [L. S.]

Attest:
  MICHAEL J. STARK,
  FRANK HIRSCH.